Jan. 6, 1970 G. KOHLER 3,488,459

CHECKING CONNECTIONS IN SWITCHING GRIDS

Filed Aug. 16, 1966 2 Sheets-Sheet 1

United States Patent Office 3,488,459

Patented Jan. 6, 1970

3,488,459

CHECKING CONNECTIONS IN SWITCHING GRIDS

Gerhard Kohler, Korntal, Germany, assignor to International Standard Electric Corporation Filed Aug. 16, 1966, Ser. No. 572,824
Claims priority, application Germany, Aug. 20, 1965, St 24,293
Int. Cl. H04m 3/28, 3/22
U.S. Cl. 179—175.2 7 Claims

ABSTRACT OF THE DISCLOSURE

Checking connection arrangements are provided for use in establishing checking connections in switching grids controlled by route search networks.

Figure 1:
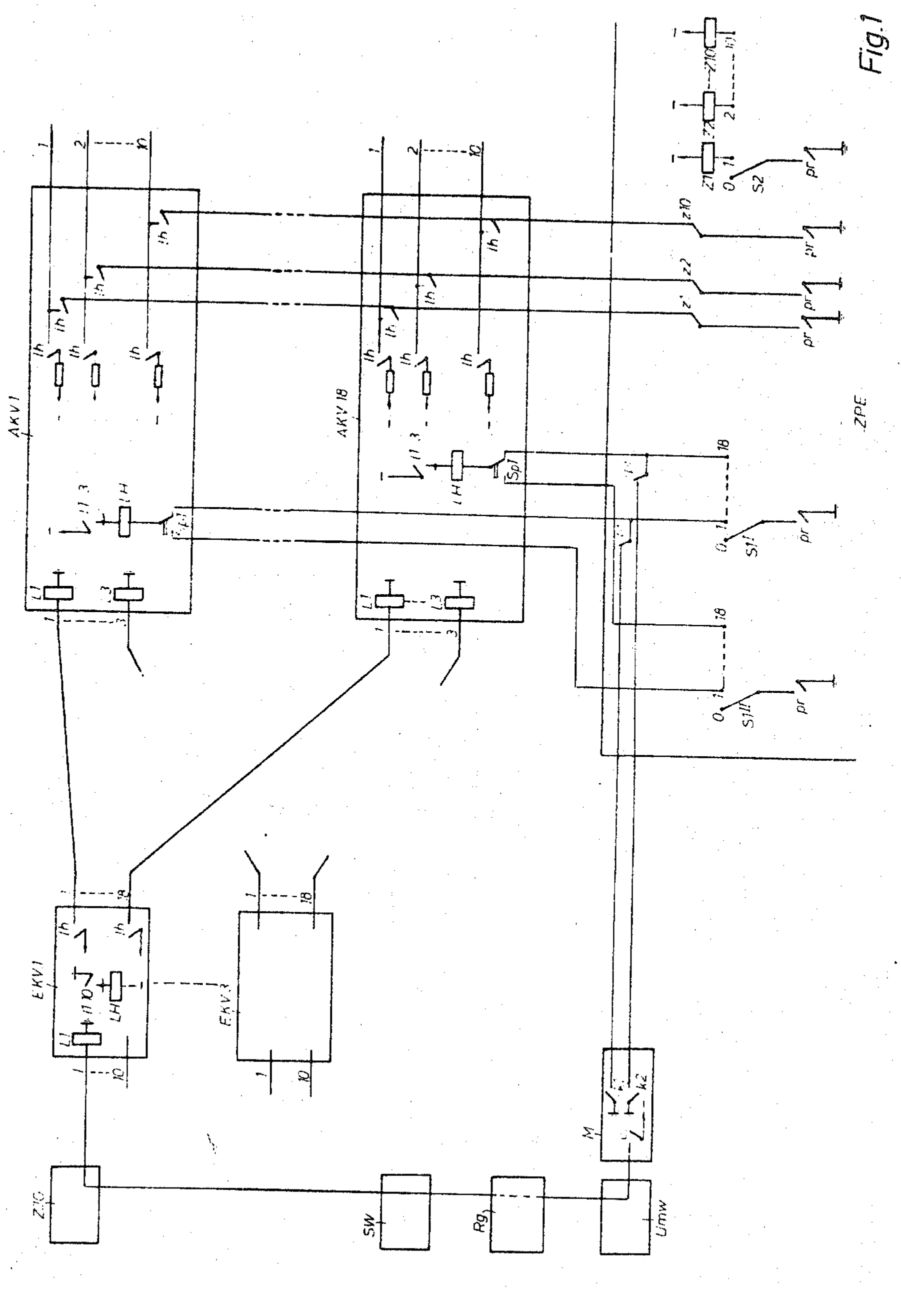

The invention relates to telephone exchange systems and more particularly to a circuit arrangement for reserving connecting paths to be used to establish checking connections in switching grids controlled by route search networks. The inventive arrangement is particularly well suited to sytems in which a defined, preset connecting path is reserved through crosspoint arrangements for checking connections to be established afterwards. This check prevents seizure of the desired path or of parts of the paths through regular connections.

The seizure of defined connecting paths or parts of such paths is done for checking connections to determine if the connecting paths are idle or in order to check them on their function or on probable failures.

In the known arrangements, however, it is possible for a checking connection of a corresponding connection path to be seized by a regular connection, so that the intended checking connection cannot be established. This is particularly possible during rush hours. But it is known, on the other hand, that certain troubles occur only during rush hours, whereas they very seldom occur during hours of low traffic, so that such troubles or failures cannot be determined when establishing checking connections during rush hours.

It is the object of this invention to provide a checking arrangement wherein by selecting defined parts of the system a predetermined checking connecting path can be established under all circumstances even during rush hours.

A reliable checking arrangement is achieved, according to the invention in that the advance of the guide potential on the path or on parts of the corresponding crosspoint arrangement for regular connections is prevented. The switching off of the guide potential is automatically canceled when the intended checking connection is established during the period of establishing the regular connection.

In a further embodiment of the invention, the arrangement according to said invention, is characterized in that the premarked connecting paths or parts thereof are blocked manually either from a central unit or individually.

A further object of the invention is to provide means to automatically or manually cancel the blocking of the premarked checking path or of parts thereof after the checking path has been marked.

A still further object of the invention is to provide means for maintaining the premarked checking path blocked over a longer period and thereafter cancelling the blocking either automatically or manually.

Yet another object of the invention is to provide means for reserving a connecting path or of parts thereof within the crosspoint arrangement, independent of the reservation of its output.

The circuit arrangement, according to the invention, provides a first switching means in a common checking device, that selects the defined output switching multiple. A second switching means is provided that selects a defined output in the selected output switching multiple through which the checking path to be prepared shall be routed. Further, a checking connection identification relay is provided which, when a checking connection is established, marks the outputs in the selected output switching grid that have not been selected. Ground is removed from the selected output when a relay associated with the output is energized and when the output has been prepared by the output selecting switch, whereby said output can be seized.

The circuit arrangement is characterized in that in the output switching multiples, the provided offering signal-advancing relays can be switched, under the control of a blocking key individual to each output switching multiple. The blocking key switching is independent of the marking potential of the marker, and switches the multiple to a marking potential that depends on both the position of a switch used for selecting a defined output switching multiple and on the condition of the checking connection marking relay. The relay premarks the respective connecting path as busy to prevent its reseizure by a regular connection. When establishing the checking connection through response of the checking connection marking relay, the marking potential is separated from the premarked checking path. This marking potential is applied simultaneously to all other, not premarked, free outputs of the corresponding output switching multiple.

In another embodiment of the inventive arrangement, a repeater simulator is provided which checks the test relay, associated to the desired output in the marker through a switch, brought into a position associated to the respective output, instead of previous pulling of the blocking key, associated to the checked repeater for the outgoing traffic direction, reserving the repeater, blocked for regular connections, for the premarked checking connection.

Switching means are provided in a further embodiment of the invention which prevent other switching elements from checking on the repeater simulation at the same time and on the same test wire.

Figure 2:
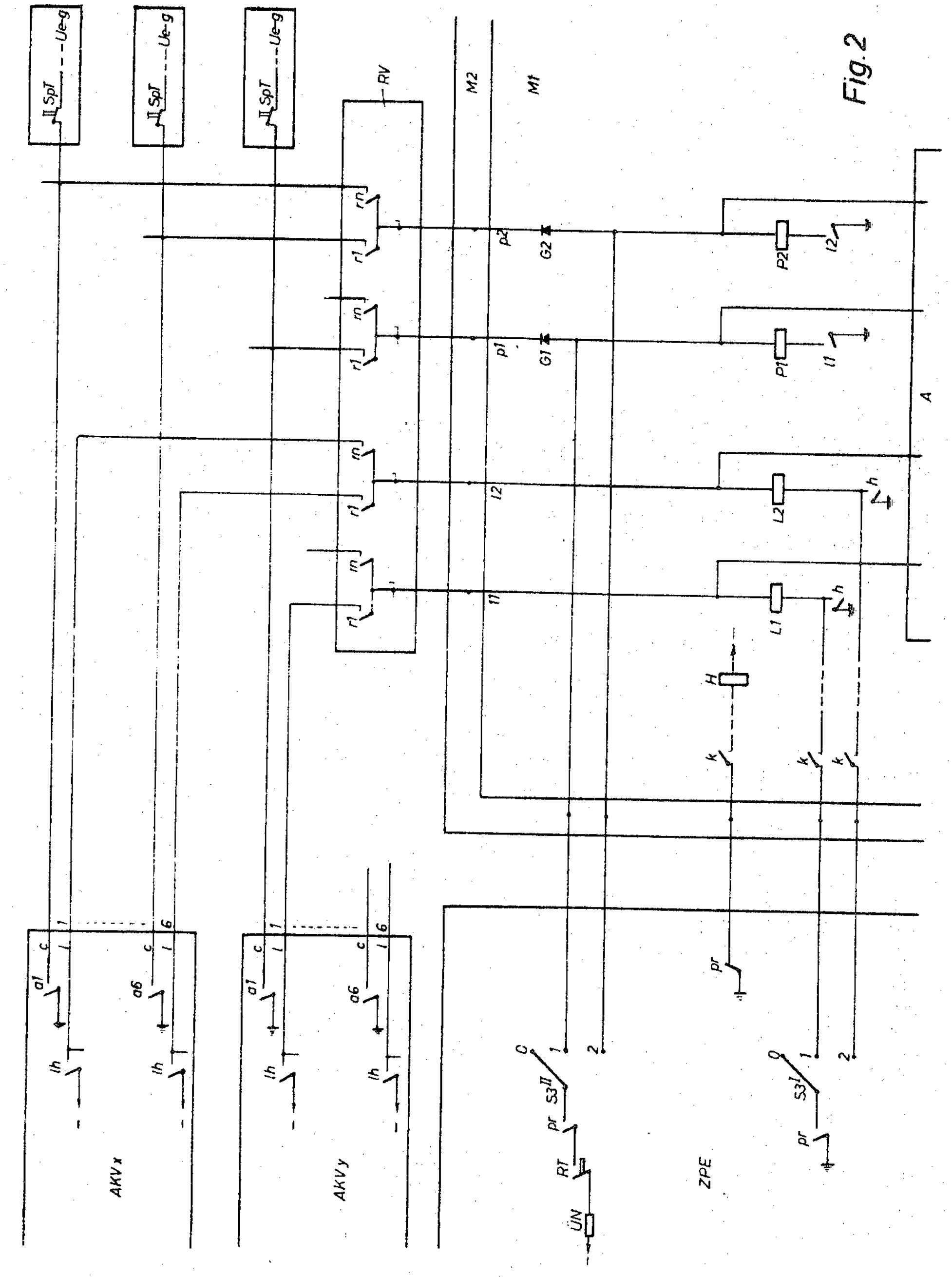

The above mentioned and other features of this invention and the manner of obtaining them will become more apparent, and the invention itself will be best understood by reference to the following description of an embodiment of the invention taken in conjunction with the accompanying drawings, in which:

FIG. 1 represents a survey block diagram of the circuit arrangement for a switching grid with more than two switching stages, which can be set centrally according to the guide-wire method, and in which a central testing device, according to the invention, is associated with the second switching stage; and FIG. 2 also shows a survey block diagram for applying the idea of the invention at the output of the crosspoint arrangement.

FIG. 1 illustrates a checking device according to the invention, in a circuit arrangement for a multi-stage switching grid. The circuit shown is one controlled according to the guide-wire method and the checking device is inserted in the rear of the second switching stage.

With the aid of FIG. 1 the establishment of a regular connection through the two-stage switching grid will first be described. Then, the inventive checking arrangement will be described.

When marking a defined input, in an input switching multiple, for example, multiple EKV1 (other than the input switching multiple EKV1, only the input switching multiple EKV3 is shown). The offering signal voltage or test voltage, through one of the contacts, such as contact 1*h*, extends fan-like on the intermediate leads 1 to 18 to all outputs of the output switching multiple AKV, in a way known to the art. This is shown in FIG. 1 wherein it is readily apparent that the relay L1 in the input switching multiple EKV operates due to the closing of contact *c* in the marker M. Relay LH operates responsive to the operation of relay L1. Operated relay LH applies the test voltage through its contacts 1*h* to the intermediate leads, feeding the output switching multiples AKV1 to AKV18.

In the output switching multiples AKV1 to AKV18 the relays L1, connected to said intermediate leads, respond and actuate the corresponding relays LH which receive grounding potential on their second winding terminal from contacts K1 in the marker M, common break contacts *pr*, and blocking switch S*pt*. Relays LH apply, through their contacts 1*h*, and resistor R, negative potential to all idle outputs.

In such a switching arrangement, the only speech wires that can be through-connected are the ones whose guide-wires have carried the offering or test signal during the offering or test process. Therefore, a checking connection via a predetermined connecting path through the switching grid is obtained only when the offering signal can extend only across the intended path or route. For example, the offering signal should pass, if a checking connection is established from the input 1 of the input switching multiple EKV1 to the output 1 of output switching multiple AKV1, only through the multi-stage switching grid, shown in FIG. 1.

In order to achieve this unique connection the respective output switching multiple and, within said multiple, the respective output is selected through a particular switching means, prior to establishing the checking connection. Rotary selectors S1 and S2, shown on FIG. 1, in the checking device ZPE accomplish the selection. When setting the selector S1 to a defined step 1 to 18, a defined output switching multiple AKV1 to AKV18 is selected, and with the setting of selector S2 one of the ten outputs of the respective output multiple, determined by setting of switch S1, is preparatorily selected.

When establishing a defined checking connection, a relay PR, arranged in the central checking device ZPE (not shown on FIG. 1) responds through contacts *pr*, connected from ground to the selector bridges to identify and mark the checking connection determined by the setting of the selectors. The input of the input switching multiple EKV1 is clearly marked with the test signal by the counting pulse sender ZIG. The test signal at first advances on all intermediate leads and can, therefore, cause the response of the offering signal receiving relays L1 etc. associated with the respective intermediate leads in all obtainable input switching multiples. This means that in the example shown on FIG. 1 all relays L1 in all output switching multiples AKV1 to AKV18 respond, applying voltage to the corresponding signal advancing relays LH. Of the relays LH, the only one that can respond belongs to the previously selected output switching multiple—in the example the output switching multiple AKV1. The response occurs as soon as relay PR in the central checking device responds, because only this relay LH is grounded via the block key S*p*T, the selector S1I and the closed contact *pr*.

The selected relay LH applies voltage to all outputs 1 to 10 of the respective output switching multiple, via a resistor R and through-connects all outputs to the checking device ZPE through further contacts L*h*. If the relay now responds when establishing the premarked checking connection, ground potential is applied across the corresponding contacts *pr* as busy criterion to all outputs of the selected output switching multiple, except that output selected to which the selector S2 is set because the corresponding relay Z1 to Z10 responds via the output, opening its contacts and thereby disconnecting the busy potential from said output. The offering signal therefore appears only at this single output. In the example shown, only relay Z1 responds, opening its contact *z*1 and only at the output 1 of the output switching multiple AKV1 the offering signal appears, while to all other outputs 2 to 10 ground potential is applied as busy signal.

The offering signal at the output 1 may energize a receiving relay in a succeeding switching stage, not shown on the drawing, thereby advancing the offering signal in the same manner.

The checking path, premarked by setting the selectors S1 and S2 according to the preceding explanations, is, however, also accessible for the establishment of any regular connection as long as the checking connection has not been completed. It may therefore occur, particularly during rush hours, that the checking connection cannot be established, because the premarked checking path or parts thereof are seized by regular connections. The checking connection has no priority over regular connections.

Now commences the inventive arrangement which will be described. The checking connection to be established has priority over the regular connections in that a connecting path and/or parts thereof, premarked as a checking path is blocked against seizure through regular connections, if said path is idle. If it is seized through a regular connection and becomes idle after said connection has been released, it remains blocked against another seizing through another regular connection still to be established.

The blocking is achieved by actuating the blocking key S*p*T in the selected output switching multiple AKV1 to AKV18 to which the selector S1 is set. The blocking key S*p*T prevents the reservation of the extension of the guide potential on the connecting routes.

The key also acts to inhibit relay LH so that in the blocked output switching multiple, e.g. AKV1, the offering signal receiving relays L1 to L3 may still respond. But relay LH cannot advance the offering signal to the outputs 1 to 10. The output switching multiple selected is therefore blocked against seizure and the connecting path running through said multiple is undisturbed.

When the premarked checking connection is established and the aforementioned relay PR responds, the relay LH can respond via the circuit, negative battery, contact L1, . . . L3, coil LH, switch S*p*T, selector S1II, contacts *pr*, ground. Thus, the operated relay PR renders the checking path, premarked by setting of the selectors S1 and S2, effective, as already described above. The previous blocking of this selected checking connection is thereby canceled and the premarked connecting path can be established. This completed, relay PR drops again and the se-selected output switching multiple AKV1 is again blocked against seizing till the key S*p*T has been restored to its normal position.

If now a connecting path or parts thereof, premarked as a checking path, is seized through a regular connection this checking route can be established only when the existing regular connection has been released. If it is desired to establish a checking connection without delay, care should be taken that no route pieces, seized through regular connections, are inserted in the checking path to be premarked. For this purpose, signal lamps are employed giving an indication of the line condition.

It is also possible to make the circuit arrangement so that an entire output switching multiple is not blocked, but only the premarked path or the thereto provided route piece for establishing the checking connection without exceeding the scope of the invention.

Another advantageous construction according to the invention is to cancel automatically the blocking of a premarked connecting path against another seizing by the regular telephone traffic after the premarked checking connection has been established. Thus, the corresponding output switching multiple or the blocked connecting path is immediately available for regular seizing, as soon as the connecting path has been established.

FIG. 2 shows that several repeaters U*e–g* for outgoing traffic can be reached from the outputs 1 to 6 of the output switching multiple AKV*x*, . . ., AKV*y*.

The manner in which the output of the crosspoint arrangement can be reserved for a defined checking connection will be described with the aid of the circuit arrangement of FIG. 2. The essential switching processes used when seizing a repeater U*e–g* are first described in short.

When a relay L, . . ., according to FIG. 1, responds in one of the output switching multiples AKV*x*, . . . AKV6, the offering signal advancing relay LH responds, not shown in FIG. 2. Its contacts 1*h* apply voltage as a test or offering signal to the guide wires 1 of the outputs 1 to 6 of the output switching multiple AKV*x*, . . . AKV*y*.

A seizing wire *c* is associated with each output guide wire 1 for the repeater U*e–g*. If an output is busy the associated contact *a*1 to *a*6 has applied ground potential to the corresponding *c*-wire, thereby seized the pertinent repeater U*e–g*.

The test signal is received by the corresponding relays L. FIG. 2 only shows the relays L1 and L2, after the signal has reached the marker M1, M2 via the contacts *rl* to *rn* in the connection set or connector RV. These relays L1 and L2, respectively, preparatorily connect the pertinent relay P1 or P2, respectively. Only those checking relays P can respond, in which the pertinent *c*-wire is not grounded, either through the crosspoint contacts *a*1 to *a*6 or through other switching elements, also having access to the repeaters U*e–g*.

In the selecting circuit arrangement A (known and therefore not shown on the drawing) one of the relays P1, P2 etc. is selected. The selected relay applies access potential to the pertinent guide wires. Only the guide wires L1 and L2 are shown in FIG. 2. The access potential is received by the corresponding output of the output switching grid AKV. From there, the potential is led via the preceding switching stages to the input of the entire crosspoint arrangement with the corresponding selecting processes in the marker, and through-connection is made.

When setting a checking path, the check connection marking relay PR, not shown on the drawing, in the central checking device ZPE responds and therefore only the relay L1, L2 etc., associated to a preselected output, can respond via the previously set selector S3 and its wiper S3I. All other relays L1 which have not been connected through the preparatory relay H cannot respond. The selected relay L1 etc. operates its pertinent relay P1 etc. preparatorily. But the relay P1 etc., associated to the output, can respond only, if the outgoing line or the repeater U*e–g* to be actuated is idle.

In order to reserve an output when establishing a checking connection these output busy conditions must be avoided. Therefore, the following switching measures are taken, in order to establish a defined checking path:

(1) If the repeater U*e–g* associated with the corresponding output is idle the blocking key S*p*T is pulled to block the associated repeater against another seizing.

(2) The key RT in the checking device ZPE is closed. Voltage thus is preparatorily applied to contact *pr*, through VN. Contact *pr* closes when the checking connection is being established and renders the corresponding circuit for the respective relay P1 etc. effective through the wiper arm S3II.

(3) The corresponding relay P1 etc. checks on a repeater simulation UN in the central checking device ZPE through the aforementioned wiper arm S3II.

The rectifiers G1, G2 etc. serve to decouple from the repeater simulation other switching elements which may be tested simultaneously on the same *c*-wire.

(4) After establishing the checking connection, the corresponding crosspoint contact *a*1, . . . *a*6 mark the corresponding *c*-wire as busy by applying ground potential.

Therefore, no other switching element can test on the *c*-wire. The repeater U*e–g* remains reserved for the checking connection as long as the checking connection has not been released and blocking of the repeater U*e–g* has not been canceled by restoring the blocking key S*p*T.

(5) This kind of reservation of an output for establishing checking connection also offers the possibility that the checking connection remains limited to the connector RV. Consequently, no outgoing lines are seized unnecessarily.

The person carrying out the checking can also seize the repeater U*e–g* and, consequently, the outgoing line, if required, after the checking connection has been established. This can be accomplished since blocking of the corresponding repeater U*e–g* is again canceled by restoring the blocking key S*p*T. The corresponding crosspoint contact *a*1, . . . *a*6 then has applied ground potential to the *c*-wire selected.

But it is also possible to make the above described reservation of a connecting path within the crosspoint arrangement, independent of the reservation of its output.

While the principles of the invention have been described above in connection with specific apparatus and applications, it is to be understood that this description is made only by way of example and not as a limitation on the scope of the invention.

I claim:

1. A checking connection arrangement for use when establishing checking connections in crosspoint switching grids equipped with route searching networks using guide wires and guide potentials for establishing telecommunication connections, said arrangement comprising: checking means for reserving a defined, preset connecting path through said crosspoint grids for future checking connections, means for advancing the guide potential over parts of the said connecting path, blocking means for blocking the advance of the guide potentials for the regular connections to reserve the connections for checking, and inhibiting means for inhibiting the blocking means during the period of establishing said checking connection.

2. The arrangement of claim 1 wherein said means for reserving includes means for premarking said connecting paths, and wherein said blocking means includes a manually operated key.

3. The arrangement of claim 2 wherein said inhibiting means is automatically operated.

4. The arrangement of claim 1 wherein said means for reserving at least a part of said connecting paths within the crosspoint arrangement is indepedent of the reservation of the output of the crosspoint arrangement.

5. The arrangement of claim 4 including repeater simulation means provided in said checking means, means for applying operating potential to said checking relay associated to the desired output in the marker through said simulation means.

6. The circuit arrangement according to claim 5 and diode means for decoupling said repeater simulation means from unassociated switching elements.

7. The circuit arrangement of claim 1 including a common checking means for checking the connection through the crosspoint arrangement, first switching means for selecting a defined output switching multiple, second switching means for selecting a defined output in the selected output switching multiple over which shall pass the checking path, checking connection marking relay means connected to the selected output switching multiple for making the not selected outputs in the selected output switching multiple as busy, relay means for removing markings from the selected output, means for causing said second selecting switch means to seize said unmarked output, offering signal advancing relay means connected to the output switching multiples, blocking key means individually connected to each output switching multiple for controlling said offering signals advancing relay means responsive to a marking dependent upon the position of said second selecting switch means serving to select a defined output switching multiple and upon the condition of the checking connection marking relay for marking said selected route busy if said path is idle, and means responsive to completing the checking connection for operating said checking connection marking relay, and means responsive to the operation of said checking connection marking relay for marking the not connected corresponding outputs as busy.

References Cited

UNITED STATES PATENTS 2,562,362 7/1951 Lomax ------------ 179—175.2

KATHLEEN H. CLAFFY, Primary Examiner

A. B. KIMBALL, Jr., Assistant Examiner

U.S. Cl. X.R.

179—18

UNITED STATES PATENT OFFICE

CERTIFICATE OF CORRECTION

Patent No. 3,488,459 January 6, 1970

Gerhard Kohler et al.

It is certified that error appears in the above identified patent and that said Letters Patent are hereby corrected as shown below:

In the heading to the printed specification, line 3, "Gerhard Kohler, Korntal, Germany," should read -- Gerhard Kohler, Weilimdorf, and Klaus Nigge, Korntal, Germany, --.

Signed and sealed this 15th day of September 1970.

(SEAL)
Attest:

Edward M. Fletcher, Jr.
Attesting Officer

WILLIAM E. SCHUYLER, JR.
Commissioner of Patents